Figure 1:
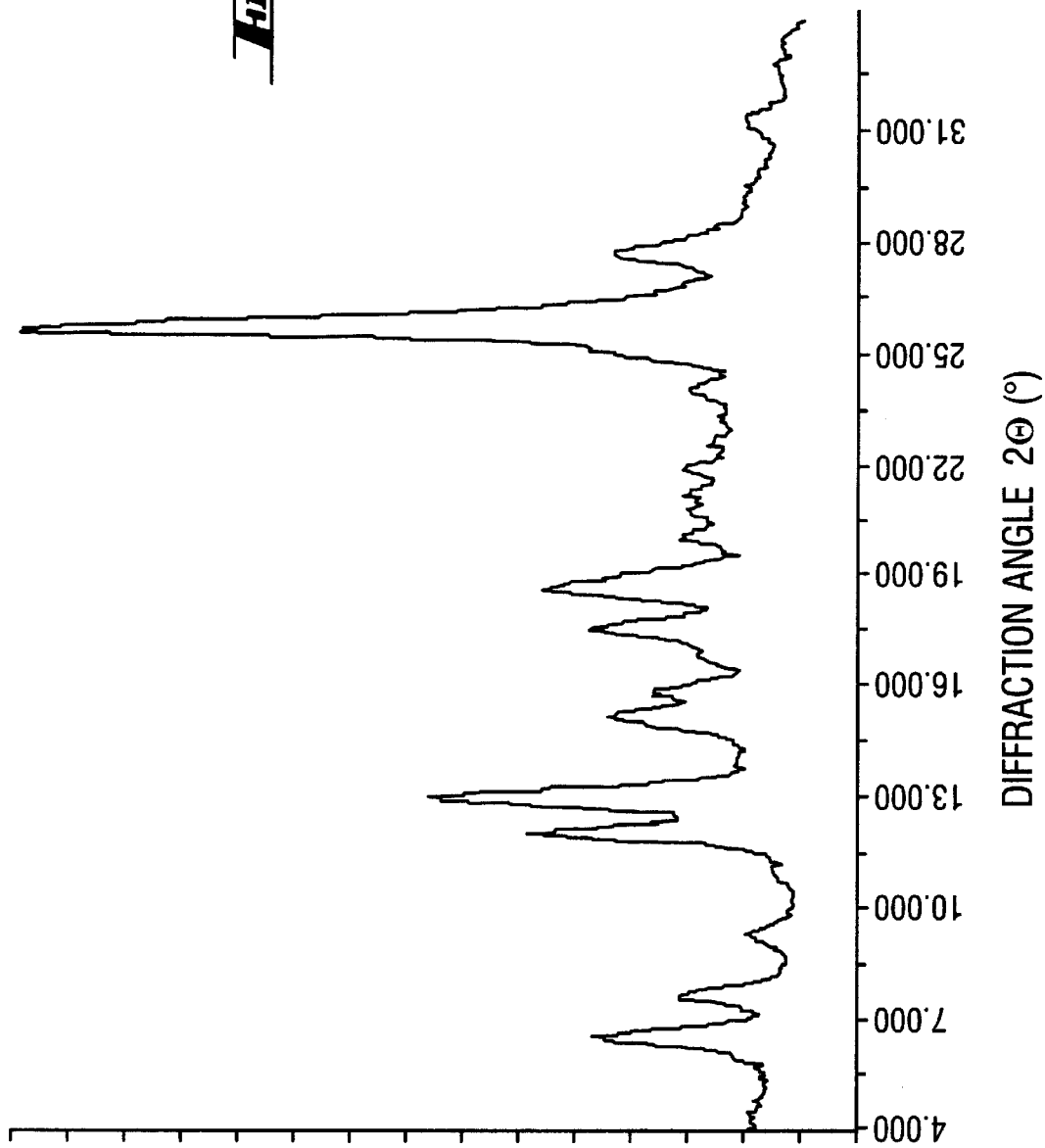

United States Patent [19]
Bühler et al.

[11] Patent Number: 5,824,117
[45] Date of Patent: Oct. 20, 1998

[54] NITROBENZISOTHIAZOLE AZO DYESTUFF

[75] Inventors: Ulrich Bühler, Alzenau; Jürgen Kühlwein, Heusenstamm; Hubert Kruse, Königstein, all of Germany

[73] Assignee: Dystar Japan Ltd., Fukuoka, Japan

[21] Appl. No.: 671,574

[22] Filed: Jun. 28, 1996

[30] Foreign Application Priority Data

Jun. 30, 1995 [DE] Germany .................. 195 23 924.5

[51] Int. Cl.⁶ .............................. C09B 67/48; D06P 3/54
[52] U.S. Cl. ................... 8/526; 8/533; 8/922; 8/921; 8/691; 534/581; 534/575; 534/788
[58] Field of Search ................... 534/575, 581, 534/788; 8/526, 691, 922, 533

[56] References Cited

U.S. PATENT DOCUMENTS

| | | |
|---|---|---|
| 3,573,273 | 3/1971 | Seedfelder et al. . |
| 4,722,737 | 2/1988 | Brandt et al. . |
| 4,795,807 | 1/1989 | Bühler et al. . |

FOREIGN PATENT DOCUMENTS

| | | |
|---|---|---|
| 0234474 | 9/1987 | European Pat. Off. . |
| 0240902 | 10/1987 | European Pat. Off. . |
| 1568501 | 5/1969 | France . |
| 2203855 | 5/1974 | France . |
| 2235172 | 1/1975 | France . |
| 2304650 | 10/1976 | France . |
| 60-246885 | 12/1985 | Japan . |
| 1438586 | 6/1976 | United Kingdom . |
| 1466586 | 3/1977 | United Kingdom . |
| 1547226 | 6/1979 | United Kingdom . |

Primary Examiner—Margaret Einsmann
Attorney, Agent, or Firm—Connolly & Hutz

[57] ABSTRACT

The present invention relates to the dyestuff of the formula I

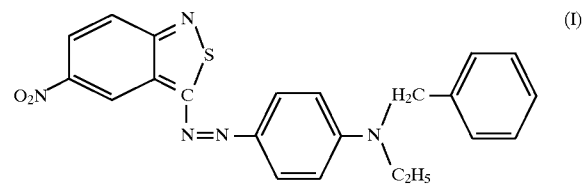

modifications of this dyestuff which are stable during dyeing, processes for the preparation thereof and their use for dyeing and printing synthetic fiber materials.

8 Claims, 3 Drawing Sheets

DIFFRACTION ANGLE 2Θ (°)

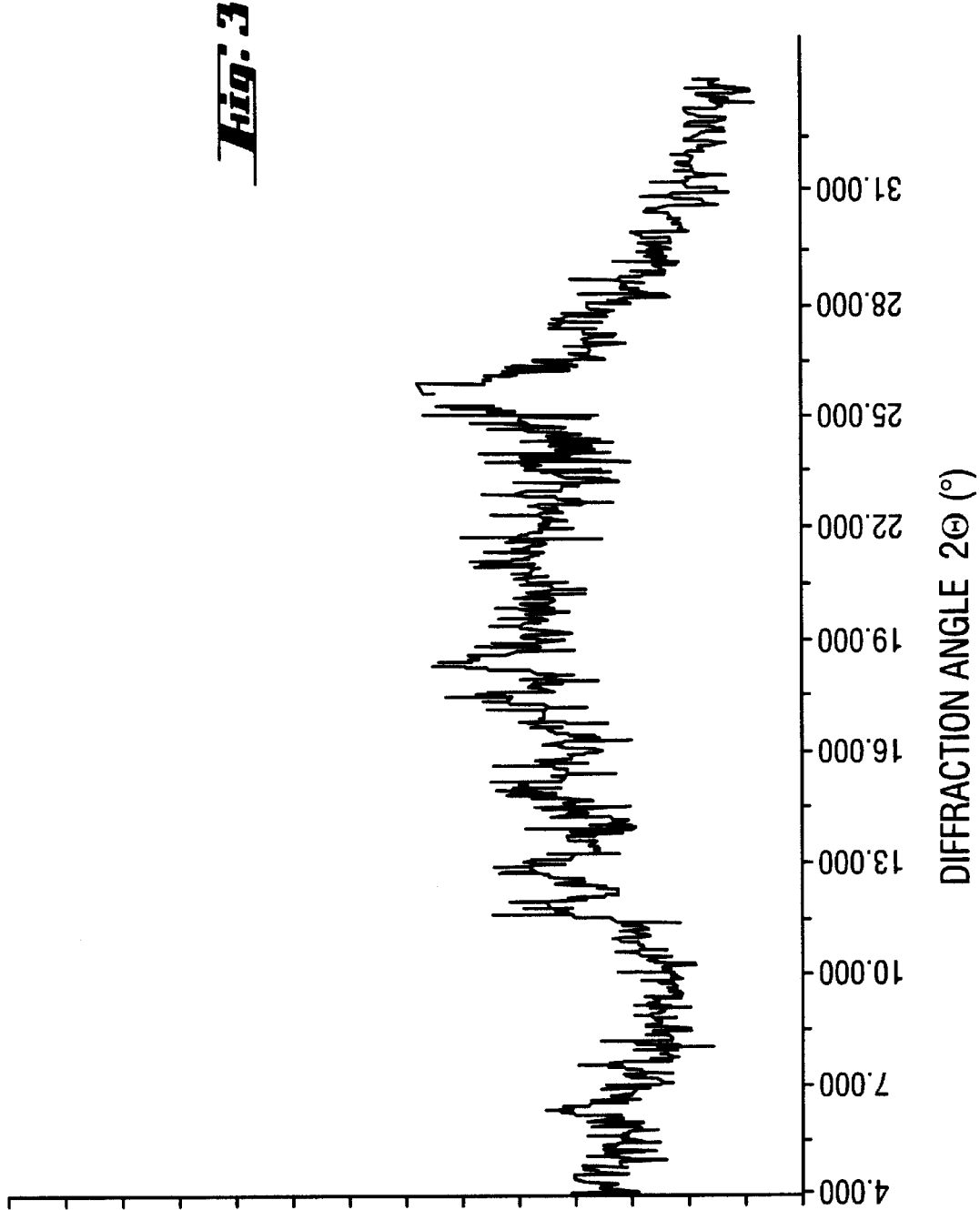

NITROBENZISOTHIAZOLE AZO DYESTUFF

The present invention relates to a nitrobenzisothiazole azo dyestuff, modifications of this dyestuff which are stable during dyeing, processes for the preparation thereof and the use thereof for dyeing and printing synthetic fiber materials.

Dyestuffs which are structurally similar to the dyestuff according to the invention are already known from DE-A 1 644 061 and JP 93 015836.

However, it has now been found, surprisingly, that the dyestuff according to the invention, of the formula I

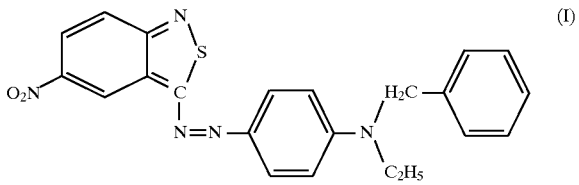

offers advantages over these known dyestuffs, in particular in respect of its dyeing properties and its fastness properties during use. The advantages lie, for example, in the tinctorial strength, in the build-up and exhaustion properties in various dyeing processes and on various substrates, in the level-dyeing power, in the sensitivity to pH and reduction, in the staining of cotton and in the fastness to light, fastness to thermo-fixing and fastness to perspiration.

The present invention thus relates to the dyestuff of the formula I. It can be prepared in a manner known per se, for example by diazotization of 3-amino-5-nitro-1,2-benzisothiazole and coupling the diazotization product to N-benzyl-N-ethylaniline.

It has been found that, in this preparation process, the dyestuff of the formula I is obtained in an amorphous modification which is characterized by the X-ray diffraction diagram shown in FIG. 3 (Cu-K$_\alpha$ radiation).

It has furthermore been found that the dyestuff of the formula I can also exist in two other crystal modifications.

The present invention therefore also relates to a crystal modification of the dyestuff of the formula I (called modification 1 below) which has lines of the following diffraction angles 2 θ (°) in the X-ray diffraction diagram (Cu-K$_\alpha$ radiation):
Lines of high intensity: 25.8
Lines of moderate intensity: 6.5; 7.6; 9.3; 12.0; 13.0; 15.1; 15.8; 17.5; 18.6; 20.0; 21.9; 24.0; 27.7; 31.0

The complete diagram is shown in FIG. 1.

The present invention furthermore relates to a crystal modification of the dyestuff of the formula I (called modification 2 below) which has lines of the following diffraction angles 2 θ (°) in the X-ray diffraction diagram (Cu-K$_\alpha$ radiation):
Lines of high intensity: 12.0; 16.1; 17.0; 20.4; 21.9; 23.7; 26.4; 27.1;
Lines of moderate intensity: 6.0; 8.1; 9.9; 14.2; 18.5; 23.1; 24.3; 25.1; 28.5; 30.2; 31.1; 32.6; 33.1

Figure 2:
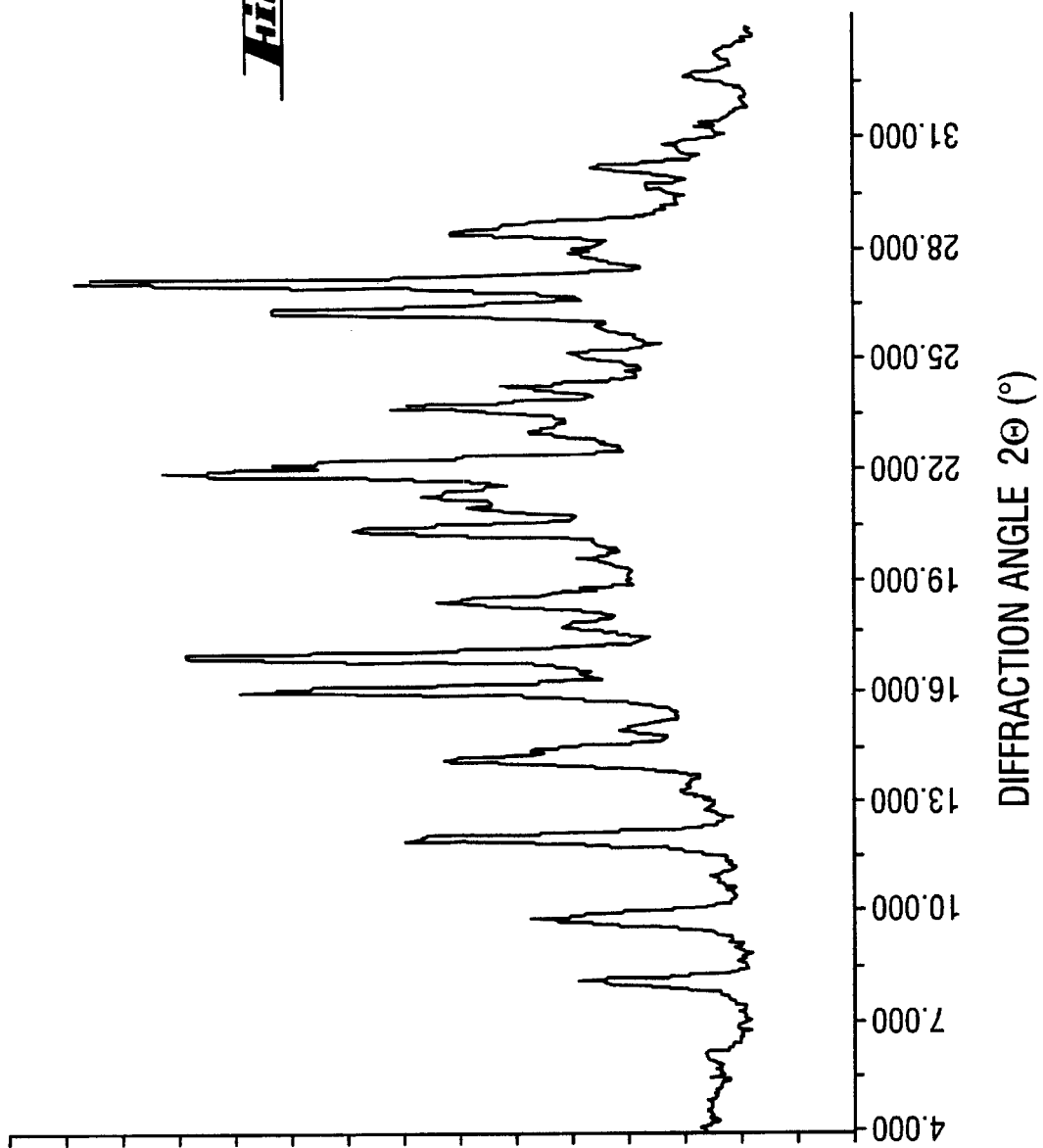

The complete diagram is shown in FIG. 2.

A computer-controlled Siemens D 500 powder diffractometer was used to record the X-ray diffraction diagrams of FIGS. 1 to 3.

Modification 1 of the dyestuff of the formula I can be obtained, for example, by coupling diazotized 3-amino-5-nitro-1,2-benzisothiazole to N-benzyl-N-ethylaniline in the presence of suitable coupling auxiliaries.

Suitable coupling auxiliaries are, for example, esters of optionally substituted lower aliphatic carboxylic acids and optionally substituted aliphatic alcohols; tertiary phosphoric acid esters of fatty alcohols and/or fatty alcohol polyethylene glycol ethers; tertiary phosphoric acid esters of fatty alcohol polyethylene glycol ethers and/or polyethylene glycols; fatty alcohol polyethylene glycol ethers; fatty acid polyethylene glycol esters; tributylphenyl polyethylene glycol ethers; nonylphenyl polyethylene glycol ethers; and graft polymers based on polypropylene glycol and ethylene oxide.

Lower aliphatic carboxylic acids are understood as meaning those having up to 6 carbon atoms. Suitable esters of lower aliphatic carboxylic acids are derived, for example, from aliphatic monocarboxylic acids having 1 to 6 carbon atoms or dicarboxylic acids having 2 to 6 carbon atoms and from aliphatic alcohols having 1 to 8 carbon atoms. In particular, such esters of lower aliphatic carboxylic acids have the formula II $$R^1\text{---}CO\text{---}OR^2 \qquad (II)$$

in which
R$^1$ is H, alkyl having 1 to 5 carbon atoms or —(CH$_2$)$_n$CO—OR$^3$,
R$^2$ and R$^3$ are alkyl having 1 to 8 carbon atoms and n is 0 to 4.

The radicals R$^2$ and R$^3$ can be identical or different. They are usually identical. The alkyl radicals represented by R$^1$, R$^2$ and/or R$^3$ can be straight-chain or branched. Suitable carboxylic acid esters are, for example, methyl, ethyl, propyl, i-propyl, butyl, i-butyl, sec-butyl, pentyl, i-amyl, hexyl, heptyl and i-octyl formate, acetate, propionate, butyrate, i-butyrate, valerate, i-valerate and caproate and dimethyl, -ethyl, -propyl, -i-propyl, -butyl, -i-butyl, -sec-butyl, -pentyl, -i-amyl, -hexyl, -heptyl and -i-octyl oxylate, malonate, succinate, glutarate and adipate.

Esters of formic, acetic and propionic acid and esters having 3 to 8 carbon atoms are preferred. Methyl, ethyl, propyl, i-propyl, butyl and i-butyl acetate and propionate are particularly preferred.

A mixture of 2 or more such carboxylic acid esters can of course also be used.

In the context of the present invention, fatty alcohols from which the coupling auxiliaries mentioned are derived in some cases are preferably to be understood as meaning C$_{10}$- to C$_{18}$-alcohols, particularly preferably C$_{14}$- to C$_{18}$-alcohols, which are based on saturated or unsaturated, straight-chain or branched aliphatic hydrocarbons, it being possible for the basis of a coupling auxiliary to be not only an individual alcohol having a certain number of carbon atoms but also a mixture of alcohols having, for example, different numbers of carbon atoms and/or a different degree of saturation in any desired ratios of amounts. A suitable basis for the auxiliaries according to the invention is, for example, lauryl alcohol, myristyl alcohol, palmityl alcohol, stearyl alcohol, unsaturated oleyl alcohol, saturated coconut fatty alcohols having 10 to 18 carbon atoms, saturated tallow fatty alcohols having 16 to 18 carbon atoms or a mixture having 16 to 18 carbon atoms containing oleyl alcohol. The designation R$^o$ is used in the following for the saturated or unsaturated (C$_{10}$–C$_{18}$) -hydrocarbon radical of fatty alcohols, and fatty alcohols then thus have the formula R$^o$OH.

The polyethylene glycol units contained in the coupling auxiliaries mentioned are based on the polyethylene glycols of the formula H(OCH$_2$CH$_2$)$_n$OH, from which the coupling auxiliaries are obtained formally by etherification and/or esterification on one or both hydroxyl groups. In the case of industrial preparation of the coupling auxiliaries, the polyethylene glycol unit is introduced, in particular, by reaction, for example of a fatty alcohol, with ethylene oxide, it being possible for the number of moles of ethylene oxide per mole of substance to be oxyethylated to be varied within wide limits. In the case of industrial oxyethylation, mixtures of substances of different degree of oxyethylation are in general obtained, and the average number of moles of ethylene oxide per mole of substance to be oxyethylated which characterizes an industrial product is often also not an integer but a fraction.

Tertiary phosphoric acid esters of fatty alcohols and/or fatty alcohol polyethylene glycol ethers are compounds of the formula $O=P(OR^4)(OR^5)(OR^6)$, in which the radicals $R^4$, $R^5$ and $R^6$ can be identical or different. The alcohols $R^4OH$, $R^5OH$ and $R^6OH$ on which they are based can be, independently of one another, fatty alcohols of the formula $R^0OH$ or fatty alcohol polyethylene glycol ethers of the formula $R^0(OCH_2CH_2)_pOH$, in which p is preferably a number from 1 to 10, particularly preferably a number from 1 to 4.

Tertiary phosphoric acid esters of fatty alcohol polyethylene glycol ethers and/or polyethylene glycols are compounds of the formula $O=P(OR^7)(OR^8)(OR^9)$, in which the radicals $R^7$, $R^8$ and $R^9$ can be identical or different. The alcohols $R^7OH$, $R^8OH$ and $R^9OH$ on which they are based can be, independently of one another, fatty alcohol polyethylene glycol ethers of the formula $R^0(OCH_2CH_2)_qOH$ or polyethylene glycols of the formula $H(OCH_2CH_2)_rOH$, in which q is preferably a number from 1 to 10, particularly preferably a number from 1 to 4, and r is preferably a number from 2 to 15, particularly preferably a number from 5 to 10.

Fatty alcohol polyethylene glycol ethers are compounds of the formula $R^0(OCH_2CH_2)_sOH$, in which s is preferably a number from 5 to 50, particularly preferably a number from 10 to 30.

Fatty acid polyethylene glycol esters are compounds of the formula $R^{10}CO(OCH_2CH_2)_tOH$, in which t is preferably a number from 5 to 50, particularly preferably a number from 10 to 30. $R^{10}$ is the saturated or unsaturated hydrocarbon radical of a fatty acid. Preferred fatty acids of the formula $R^{10}COOH$ here in the context of the present invention are saturated or unsaturated $C_{10}$- to $C_{20}$-fatty acids, and $C_{16}$- to $C_{19}$-fatty acids are particularly preferred. Examples of suitable fatty acids are myristic acid, palmitic acid, stearic acid or oleic acid, and their mixtures in any desired ratios of amounts.

Tributylphenyl polyethylene glycol ethers and nonylphenyl polyethylene glycol ethers are compounds of the formula $Ar(OCH_2CH_2)_uOH$, in which u is preferably a number from 5 to 50, particularly preferably a number from 10 to 30, and Ar is a tributylphenyl radical or a nonylphenyl radical. The alkylphenols of the formula ArOH on which they are based are in general industrial products, which usually comprise various isomers in different ratios of amounts.

Graft polymers based on polypropylene glycol and ethylene oxide are compounds of the formula

in which v+x is a number from 2 to 100, preferably a number from 2 to 50, w is a number from 1 to 50, preferably a number from 1 to 25, and v+w+x is a number from 20 to 150, preferably a number from 50 to 120.

Preferred coupling auxiliaries are graft polymers based on polypropylene glycol and ethylene oxide. As surface-active substances, the polymeric coupling auxiliaries mentioned can also be characterized by their HLB (hydrophilic-lipophilic balance) value (cf., for example, Römpps Chemie-Lexikon [Römpps Chemical Dictionary], 8th Edition, Stuttgart 1983, page 1715). The HLB values of the fatty alcohol polyethylene glycol ethers, fatty acid polyethylene glycol esters and tributylphenyl and nonylphenyl polyethylene glycol ethers to be employed are preferably 8 to 18, and the HLB values of the graft polymers based on polypropylene glycol and ethylene oxide which are to be employed are preferably 4 to 16.

Mixtures of the carboxylic acid esters mentioned and the polymers mentioned are also preferably used as coupling auxiliaries. Mixtures of the respectively preferred coupling auxiliaries are particularly preferred here.

The amounts employed of the polymeric coupling auxiliaries are preferably 0.05 to 10% by weight, particularly preferably 0.5 to 3% by weight, based on the dyestuff formed during the coupling (calculated as the dry dyestuff).

The amounts employed of the carboxylic esters used as coupling auxiliaries are preferably 1 to 30% by weight, particularly preferably 2 to 15% by weight, based on the dyestuff formed during the coupling (calculated as the dry dyestuff).

The coupling for the preparation of the dyestuff of the formula I in the modification 1 which is stable during dyeing is carried out in a manner known per se in an aqueous medium under the conditions customary for coupling reactions. The diazo component is first diazotized in the customary manner, for example using an alkali metal nitrite, such as, for example, sodium nitrite, or, preferably, nitrosylsulfuric acid. The resulting suspension or, preferably, solution of the diazonium compound is then combined with an emulsion or, preferably, acidic solution of the coupling component, the coupling being carried out in the presence of one or more of the coupling auxiliaries mentioned. In addition, other customary auxiliaries can also be present during the coupling, for example other dispersing agents, for example those based on ligninsulfonates, or on condensation products of naphthalenesulfonic acid and formaldehyde.

Preferably, the solution or suspension of the diazonium salt is allowed to run into the solution or emulsion of the coupling component. However, the reverse procedure is also possible, in which the solution or emulsion of the coupling component is allowed to run into the solution or suspension of the diazonium salt. In both procedures, the coupling auxiliary is preferably added to the solution or emulsion of the coupling component before the start of coupling. However, it can also be added to the solution or suspension of the diazonium salt or both to the diazo and to the coupling solution or suspension or emulsion before the start of coupling. Furthermore, however, the coupling auxiliary can also be added in portions or continuously during the coupling. The coupling temperature is in general in the range from $-10°$ to $20°$ C., preferably $-5°$ to $15°$ C. When the coupling is carried out, the mixture is usually cooled directly, for example by addition of ice, or indirectly.

Modification 2 of the dyestuff of the formula I can be obtained, for example, by heating the amorphous modification or modification 1 to temperatures of preferably $70°$ to $150°$ C., inparticular $90°$ to $130°$ C., in an aqueous phase. This heating is as a rule carried out in an aqueous suspension, expediently while stirring. If the temperatures to be used are above the boiling point of the aqueous phase, the conversion into modification 2 is carried out in closed vessels, for example autoclaves.

The mixture is heated until the amorphous modification or modification 1 has been converted completely into modification 2.

Complete conversion as a rule takes 0.5 to 5 hours, it being possible for the reaction to be monitored by X-ray or microscopic analysis of samples removed during the heat treatment.

An addition of one or more surface-active substances to the aqueous phase may be expedient for the conversion into modification 2. These surface-active substances can have a wetting, viscosity-lowering, dispersing or initially dissolving action and be anionic, cationic or nonionic in nature.

Suitable surface-active substances are, for example, alkali metal salts of ligninsulfonates, alkali metal salts of the condensation products of naphthalenesulfonic acids and formaldehyde, polyvinyl sulfonates, oxyethylated novolaks, oxyethylated fatty alcohols, fatty acid polyglycol esters and tertiary phosphoric acid esters. The surface-active substances can be used individually or in combination with one another. The amount of surface-active substance, based on the amount of dyestuff of the formula I, is as a rule 0.01 to 400% by weight, and depends on the further processing.

The conversion into modification 2 by heat treatment in an aqueous phase can also be carried out with the addition of one or more organic solvents. These organic solvents can either be miscible with water in all proportions or be immiscible or only slightly miscible with water.

Water-miscible solvents are, for example, ethanol, i-propanol and dimethylsulfoxide (DMSO). Solvents which are immiscible or only slightly miscible with water are, for example, n-butanol, butyl acetate and toluene.

The temperatures for the heat treatment in an aqueous phase with the addition of organic solvents are preferably between 60° and 150° C. Depending on the temperature of the heat treatment or of the boiling point of the organic solvent added, it may be necessary to carry out the heat treatment under pressure, for example in an autoclave. The duration of the heat treatment depends, inter alia, on the dissolving power of the liquid phase, i.e., inter alia, also on the dissolving power of the organic solvent added and on its content.

The amount of organic solvents, based on the aqueous phase, can vary within wide limits. In the case of water-miscible solvents, it can be between 5 and 95% by weight, preferably between 10 and 50% by weight. In the case of solvents which are slightly miscible or immiscible with water, it is in general between 1 and 25% by weight, preferably 2 to 10% by weight.

After conversion into modification 2, the organic solvent is as a rule separated off from the dyestuff suspension by distillation or steam distillation and the dyestuff is isolated from the aqueous phase by filtration. However, the dyestuff can also be isolated from the solvent mixture directly by filtration.

During heating of the dyestuff in an aqueous phase, both a purely aqueous phase and a phase comprising organic solvents, it is advantageous to adjust the pH of the aqueous phase to 5 to 9 and to keep it at this pH, since otherwise losses in tinctorial strength and deviations in color shade may occur.

It is also possible to carry out the conversion of the amorphous modification or modification 1 into modification 2 immediately after coupling by heat treatment of the coupling suspension. This can be carried out in the same reaction vessel as the coupling. To prevent hydrolysis of the dyestuff, in this case the mineral acid originating from the diazotization and coupling is preferably neutralized entirely or substantially in the coupling suspension beforehand.

After conversion into modification 2, the dyestuff can be isolated from the aqueous suspension, for example by filtration. To avoid pollution of the wastewater and to avoid losses in yield, as a rule only 0.01 to 10% by weight, preferably 0.1 to 1% by weight, of the surface-active substances are employed here.

It is possible to finish the dyestuff as described below, i.e. to convert it into the commercially available powder or liquid preparations, immediately after the heat treatment without intermediate isolation. For this purpose, the heat-treated suspension is converted into a dispersion by grinding. It is preferable here to carry out the heat treatment in the presence of those dispersing agents and, if appropriate, also auxiliaries which the finished powder or liquid preparation is to comprise, or in the presence of a portion of these agents. These dispersing agents are identical to the surface-active substances mentioned above. If the total amount of these dispersing agents and auxiliaries has not been added during the heat treatment, the remaining amount is added before the grinding. In this case, as a rule 10 to 400% by weight, preferably 20 to 200% by weight, of surface-active substances, based on the dyestuff in the amorphous modification or modification 1, are employed for the heat treatment.

After its preparation, the dyestuff of the formula I according to the invention, whether the amorphous form, modification 1 or modification 2, must be finished.

During finishing, the dyestuff of the formula I is converted into a dispersion, i.e. into a liquid or pulverulent dyestuff preparation, by a grinding operation. This grinding is carried out in mills, such as, for example, ball, vibratory, bead or sand mills, or in kneaders. After grinding, the size of the dyestuff particles is about 0.1 to 10 $\mu$m, preferably about 1 $\mu$m. Grinding is carried out in the presence of dispersing agents, which can be nonionic or anionic. Nonionic dispersing agents are, for example, reaction products of alkylene oxides, such as, for example, ethylene oxide or propylene oxide, with alkylatable compounds, such as, for example, fatty alcohols, fatty amines, fatty acids, phenols, alkylphenols and carboxylic acid amides. Anionic dispersing agents are, for example, ligninsulfonates, alkyl- or alkylaryl sulfonates or alkylaryl polyglycol ether-sulfates.

The dyestuff formulations thus obtained should be pourable for most methods of use. The dyestuff and dispersing agent content is therefore limited in these cases. In general, the dispersions are adjusted to a dyestuff content of up to 50% by weight and a dispersing agent content of up to about 25%. For economic reasons, the dyestuff contents usually do not fall below 15% by weight.

The dispersions can also additionally comprise other auxiliaries, for example those which act as oxidizing agents, such as, for example, sodium m-nitrobenzenesulfonate, or fungicidal agents, such as, for example, sodium o-phenylphenolate and sodium pentachlorophenolate. They can also comprise wetting agents, antifreezes or hydrophilizing agents.

Powder formulations are preferred for certain fields of use. These powders comprise the dyestuff, dispersing agent and other auxiliaries, such as, for example, wetting agents, oxidizing agents, preservatives and dust removal agents.

A preferred preparation process for pulverulent dyestuff formulations comprises removing the liquid from the liquid dyestuff dispersions described above, for example by vacuum drying, freeze drying, by drying on roller dryers, but preferably by spray drying.

The dyestuff of the formula I according to the invention is preferably in modification 1 or modification 2, and in these forms does not tend to agglomerate in pulverulent and, in particular, in liquid dyestuff preparations. Modifications 1 and 2 in powder form wet better during preparation of dyeing and padding liquors and also of printing pastes than the amorphous modification and can be dispersed rapidly and without expensive manual or mechanical stirring. The liquors and printing pastes are homogeneous and can be processed in modern color shops without problems, without blocking the nozzles.

The liquid preparations do not tend toward phase separation, and in particular do not tend toward sedimentation and putty-like settling. Homogenization of the dyestuff in the drum, which is also expensive, before removal of the dyestuff can thus be omitted.

The ground paste obtained after grinding the dyestuff in the presence of the dispersing agents and auxiliaries during preparation of powders is also stable at elevated temperature and over a relatively long period of time. The ground paste in the mills, and also after leaving the mills, does not need to be cooled, and can be stored in collecting tanks for a relatively long time before spray drying. The heat stability also manifests itself in the fact that the spray drying can be carried out at high temperatures without the material to be dried agglomerating. At the same dryer discharge temperature, an increase in the intake temperature means an increase in dryer output and therefore a reduction in production costs.

The dyestuff of the formula I according to the invention is suitable, both in its amorphous form and, in particular, in the form of modifications 1 or 2, for dyeing and printing textile materials of polyester, such as polyethylene glycol terephthalate, and/or cellulose esters, such as cellulose acetates, or of blend fabrics of these materials and wool or cellulose.

The outstanding properties, in particular also of modifications 1 and 2, come clear, for example, during dyeing from an aqueous dyebath under modern conditions in practice. These conditions are characterized by high wound densities for cheese and beam dyeings, short liquor ratios, i.e. high dyestuff concentrations, and high shearing forces in the dye liquor due to high pump outputs. Even under these conditions, modifications 1 and 2 do not tend to agglomerate, and no filtering off on the textile materials to be dyed occurs. Homogeneous dyeings without differences in color strength between the outer and the inner layers of the wound packages are thus obtained, and the dyeings show no abrasion. Finally, a homogeneous, speck-free appearance of the goods is also obtained on pad-dyeings and prints with modifications 1 and 2 according to the invention.

The dyestuff of the formula I according to the invention, especially if it is in the modifications 1 and 2 which are stable during dyeing, is furthermore particularly suitable for dyeing and printing polyester fibers and polyester microfibers which have been rendered alkaline. Details of this procedure are described, for example, in Chemiefasern/Textilindustrie Volume 41/93, September 1991, page 1118; Textilveredlung 28 (1993), page 88 and Textilveredlung 28 (1993), page 96.

The dyestuff of the formula I according to the invention, especially if it is in the modifications 1 and 2 which are stable during dyeing, is furthermore also particularly suitable for dyeing polyester fibers and polyester fiber materials in an alkaline medium at pH values up to pH 11, in particular at pH 8 to pH 11, from an aqueous dyebath under HT conditions. Details of this dyeing method are to be found, for example, in DE-A 39 38 631, EP-A 624 683, EP-A 449 090, EP-A 540 936, EP-A 643 107 or International Dyer, October 1994, page 34.

EXAMPLE 1

49 g of 3-amino-5-nitro-1,2-benzisothiazole are diazotized in 90 ml of monohydrate by dropwise addition of 80 g of a 41.8% strength nitrosylsulfuric acid at 5° to 10° C. in the course of about 2 hours, and the diazo solution is subsequently stirred at 10° to 15° C. for about 5 hours in order to bring the reaction to completion. Meanwhile, 56 g of N-benzyl-N-ethylaniline are dissolved in 250 ml of water by addition of 20 g of concentrated sulfuric acid and the solution is cooled to 0° to 5° C. 10 g of butyl acetate are then added and the above diazo solution is added dropwise at 0° to 5° C. in the course of about 2.5 hours, the temperature being maintained by simultaneous addition of a total of about 800 g of ice. When the dyestuff has coupled completely at this temperature, in the course of about 3 hours, it is filtered off with suction over a porcelain suction filter, washed neutral with water and blown dry. After drying to constant weight in vacuo, 85 g of the dyestuff of the formula I which melts at 136°–8° C., dissolves in o-dichlorobenzene to give a dark blue-colored solution and absorbs at 593 nm in dimethyl phthalate are obtained. It is in modification 1.

EXAMPLE 2

50 g of the dyestuff prepared according to Example 1 are stirred in 250 ml of water in the presence of 0.01 g of an anionic wetting agent based on oleic acid in an autoclave at 130° C. for 2 hours. The dyestuff suspension is then cooled and filtered and the residue is washed with water. The dyestuff is now in modification 2, which has the X-ray diffraction diagram shown in FIG. 2.

EXAMPLE 3 a) 60 g of the dyestuff prepared according to Example 1 are ground with 140 g of a sodium ligninsulfonate in the presence of 200 g of water in a sand mill until 90% of the dyestuff particles are equal to or smaller than 1 $\mu$m. The ground paste thus obtained is spray-dried in a spray dryer at an intake temperature of 155° C. and a discharge temperature of 85° C.

b) If the powder thus obtained is introduced into water for preparation of a dye liquor, it already disperses partly during sinking to the bottom of the vessel, and disperses completely after brief stirring.

c) A powder preparation which has been prepared in the same manner as described under a) but using dyestuff of the formula I as synthesized in accordance with the doctrine of DE-A 16 44 061 is stirred with a special stirrer for a relatively long time until a homogeneous dispersion is obtained, and if necessary is then filtered, in order to obtain speck-free dyeings.

d) If cheeses are dyed with the powder preparation prepared according to a), the resulting dyeings are level and fast to rubbing, i.e. the depths of color in the inner and outer layers of the wound package are the same and no dyestuff deposits occur.

EXAMPLE 4 a) 100 g of the dyestuff prepared according to Example 2 are ground with 100 g of a sodium lignin-sulfonate, 2 g of an emulsifier based on a fatty alcohol polyglycol ether and 2 g of a hydrophilizing agent based on a sodium dibutylnaphthalenesulfonate, as well as water in a sand mill until 90% of the dyestuff particles are equal to or smaller than 1 $\mu$m. The amount of water added was calculated here such that the dyestuff content in the liquid preparation obtained after grinding is 22%.

b) If the liquid preparation prepared according to a) is forced under a pressure of about 3 kp/m$^2$ through a nozzle of VA steel of 0.7 mm diameter, exact, repeated metering is possible.

EXAMPLE 5 a) 3 g of the powder preparation of Example 3 are used for dyeing on 100 g of a woven fabric of polyethylene terephthalate in a dyeing autoclave from a dye liquor comprising 2 l of water, 2 g of a dyeing auxiliary based on a formaldehyde condensation product and 5 g of a buffer substance which is a mixture of an organic phosphorus compound and a polycarboxylic acid at 130° C. for 45 minutes, after the pH of the dye liquor has first been adjusted to 10.5 with aqueous sodium hydroxide solution. The dyeing is then rinsed, purified by reduction, rinsed again and dried. A dark blue dyeing is obtained.

b) The dyeing according to a) is repeated, 4 g of sodium acetate now being added as the buffer substance and the pH of the dye liquor being adjusted to 4.5 with acetic acid. The resulting dyeing is practically identical in color strength and color shade, and the dyestuff thus has practically not decomposed at pH 10.5.

EXAMPLE 6

50 g of the liquid preparation of Example 4a) are incorporated into a printing paste which comprises 45 g of carob bean flour, 6.0 g of sodium m-nitrobenzenesulfonate and 3.0 g of citric acid per 1000 g. If a polyester woven fabric is printed with this printing paste and the printed woven fabric is steamed, after drying under a vapor pressure of 1.5 atmospheres gauge for 15 minutes, rinsed, soaped and rinsed again, a strong dark blue print of very good coloristic properties is obtained.

We claim:

1. A crystal modification of the dyestuff of the formula I

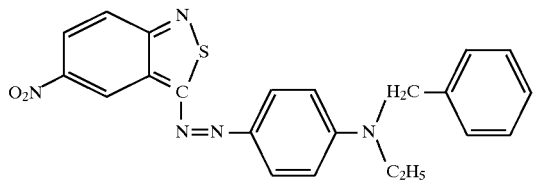

(I)

2. A method of dyeing or printing, comprising the step of dyeing or printing a polyester or cellulose ester or blend thereof or a wool or cellulose-containing textile material with the dyestuff of the formula I as claimed in claim 1 in the form of a crystal modification of said dyestuff.

3. A crystal modification of the dyestuff of the formula I as claimed in claim 1, which has lines of the following diffraction angles 2 θ (°) in the X-ray diffraction diagram (Cu-K$_\alpha$ radiation):

Lines of high intensity: 25.8

Lines of moderate intensity: 6.5; 7.6; 9.3; 12.0; 13.0; 15.1; 15.8; 17.5; 18.6; 20.0; 21.9; 24.0; 27.7; 31.0.

4. A process for the preparation of the crystal modification as claimed in claim 3, which comprises diazotizing 3-amino-5-nitro-2,1-benzothiazole and coupling the diazotization product to N-benzyl-N-ethylaniline in the presence of a coupling auxiliary.

5. The process as claimed in claim 4, wherein the coupling auxiliary employed is an ester of an optionally substituted lower aliphatic carboxylic acid and an optionally substituted aliphatic alcohol; a tertiary phosphoric acid ester of a fatty alcohol and/or fatty alcohol polyethylene glycol ether; a tertiary phosphoric acid ester of a fatty alcohol polyethylene glycol ether and/or polyethylene glycol; a fatty alcohol polyethylene glycol ether; a fatty acid polyethylene glycol ester; a tributylphenyl polyethylene glycol ether; a nonylphenyl polyethylene glycol ether; or a graft polymer based on polypropylene glycol and ethylene oxide.

6. A crystal modification of the dyestuff of the formula I as claimed in claim 1, which has lines of the following diffraction angles 2 θ (°) in the X-ray diffraction diagram (Cu-K$_\alpha$ radiation):

Lines of high intensity: 12.0; 16.1; 17.0; 20.4; 21.9; 23.7; 26.4; 27.1;

Lines of moderate intensity: 6.0; 8.1; 9.9; 14.2; 18.5; 23.1; 24.3; 25.1; 28.5; 30.2; 31.1; 32.6; 33.1.

7. A process for the preparation of the crystal modification as claimed in claim 6, which comprises heating the dyestuff formed by diazotizing 3-amino-5-nitro-2,1-benzothiazole and coupling the diazotization product to N-benzyl-N-ethylaniline in amorphous form or in the form of the modification which has lines of the following diffraction angles 2 θ (°) in the X-ray diffraction diagram (Cu-K$_\alpha$ radiation):

Lines of high intensity: 25.8

Lines of moderate intensity: 6.5; 7.6; 9.3; 12.0; 13.0; 15.1; 15.8; 17.5; 18.6; 20.0; 21.9; 24.0; 27.7; 31.0 to a temperature of 70° to 150° C. in an aqueous phase.

8. A printed or dyed textile material prepared by the method of claim 2.

* * * * *